J. N. VESELY.
LOCKING DEVICE FOR MOTOR VEHICLES.
APPLICATION FILED APR. 11, 1917.
1,291,291.
Patented Jan. 14, 1919.
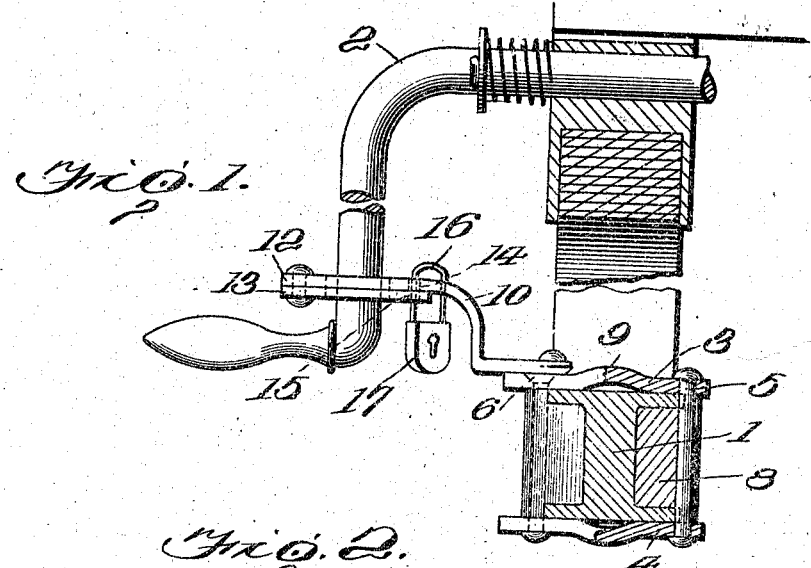
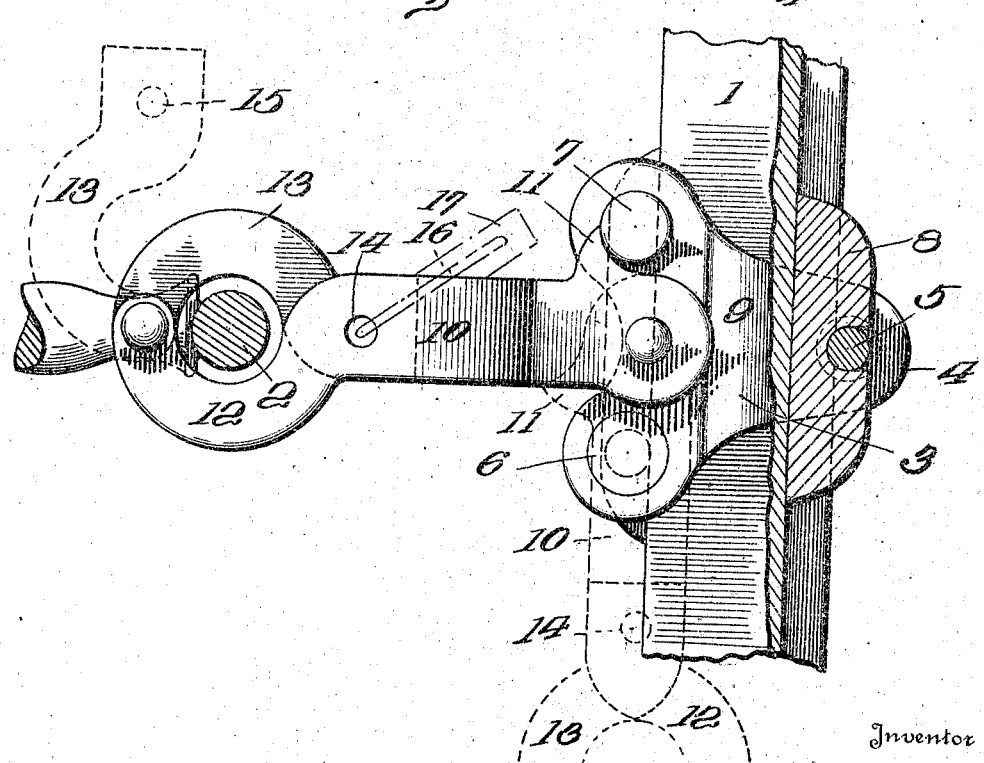

UNITED STATES PATENT OFFICE.

JOSEPH N. VESELY, OF CEDAR RAPIDS, IOWA.

LOCKING DEVICE FOR MOTOR-VEHICLES.

1,291,291.  Specification of Letters Patent.  Patented Jan. 14, 1919.

Application filed April 11, 1917. Serial No. 161,199.

*To all whom it may concern:*

Be it known that I, JOSEPH N. VESELY, a citizen of the United States, residing at Cedar Rapids, in the county of Linn and State of Iowa, have invented certain new and useful Improvements in Locking Devices for Motor-Vehicles, of which the following is a specification, reference being had therein to the accompanying drawing.

This invention relates to certain new and useful improvements in locking devices for automobiles, and more particularly to means for locking the starting crank of the automobile so as to prevent the engine from being started by an unauthorized person.

Another object of my invention is to provide a locking device which is especially adapted to be used in connection with Ford automobiles which are provided with starting cranks extending outwardly beyond the radiator, by providing a pivoted arm having means for embracing the crank in order to prevent the crank from being turned to start the engine.

Another object of my invention is to provide a construction of locking device in which an ordinary padlock can be used which is in such a position that the same can be readily reached for locking or unlocking the device.

Other and further objects and advantages of the invention will be hereinafter set forth and the novel features thereof defined by the appended claim.

In the drawings,

Figure 1 is a vertical section through the axle of a Ford automobile and a portion of my locking device, the locking arm being shown in engagement with the crank;

Fig. 2 is a top plan view partly in section of my improved construction of locking device showing the arm in full lines in engagement with the crank, and in dotted lines as swung into position to allow the crank to be operated to start the engine.

Like numerals of reference refer to like parts in the several figures of the drawing.

In the drawing 1 indicates the axle of a motor vehicle which is preferably I-shaped, 2 the starting crank for the engine, and the construction herein shown is of the Ford type having the crank extending outwardly beyond the axle.

Arranged on the top and bottom of the axle are plates 3 and 4 provided with openings through which bolts 5, 6, and 7 pass for securing said plates in position on the axle, said bolts passing through recesses formed in metal blocks 8 arranged within the channels of the axle 1 as clearly shown in Figs. 1 and 2, and these bolts are preferably riveted as shown so as to secure the plates in position upon the axle in such a manner that they can not be removed without severing the bolts. The plates are preferably provided with ribs 9 for the purpose hereinafter fully described.

Pivotally mounted on the plate 3 between the bolts 6 and 7 is an arm 10 which is capable of swinging around into the position as shown in dotted lines in Fig. 2 parallel with the axle, the movement of the arm in this direction being stopped by the rib 9 which is engaged by the under surface of the arm so as to hold the arm by frictional contact in position to allow the crank to be turned. The arm is provided with a lip 11 which is adapted to engage the head of the bolt 7 which projects upwardly beyond the top of the plate 3 so as to hold the arm at right angles to the axle, the bolt 6 being countersunk so as to allow the arm to swing around in the opposite direction into such position that the arm will be out of the path of travel of the crank in starting the engine. The arm is provided at its outer end with a substantially semi-circular portion 12 to which is connected a substantially semi-circular embracing member 13 which can be swung into the position as shown in dotted lines in Fig. 2 to allow the embracing portion of the arm 12 to engage the crank 2, and by swinging the embracing member 13 around into position as shown in full lines in Fig. 2, the crank will be embraced. The arm is provided with an opening 14 and the embracing member with an opening 15 which are adapted to register when in the position as shown in full lines in Figs. 1 and 2 and through which the shackle 16 of a padlock 17 is adapted to pass for locking the embracing member 13 around the starting crank, and it will be seen that in this position the crank is locked positively so as to prevent the same from being turned to start the motor.

From the foregoing description it will be seen that I have provided a locking device for a crank of a motor vehicle in which a pivoted arm is carried by the axle of the vehicle, and is capable of being swung outwardly in position to embrace the crank and is provided with means to receive and secure the crank to the arm for preventing the crank from being turned, said arm being capable of being swung in such a position that it will be held parallel with the axle out of the path of travel of the crank in order to allow the crank to be operated for starting the vehicle.

I claim:

In a locking device for the starting crank of a motor vehicle, the combination with the axle of the vehicle, of a horizontally disposed support mounted on the top of the axle having an upwardly extending rib presenting an inclined face, a rigid arm pivotally mounted on said support in advance of said rib having means for embracing said crank, means for locking said embracing means to the crank means for limiting the movement of said arm in one direction, said arm being adapted to be held in inoperative position by being moved into frictional engagement with the inclined face of said rib.

In testimony whereof I hereunto affix my signature in the presence of two witnesses.

JOSEPH N. VESELY.

Witnesses:
A. T. VESELY,
EMIL VASTRY.